United States Patent [19]

Simington

[11] Patent Number: 4,584,910

[45] Date of Patent: Apr. 29, 1986

[54] GRINDING MACHINE FOR CUTTERS IN SAW CHAIN

[75] Inventor: Jack F. Simington, Chiloquin, Oreg.

[73] Assignee: Simington Products Company, Chiloquin, Oreg.

[21] Appl. No.: 720,863

[22] Filed: Apr. 8, 1985

[51] Int. Cl.$^4$ ............................................. B23D 63/16
[52] U.S. Cl. ...................................... 76/40; 76/25 A; 76/75
[58] Field of Search ............... 76/25 A, 37, 40, 75–77, 76/41, 42, 43

[56] References Cited

U.S. PATENT DOCUMENTS 4,044,635 8/1977 Simington ............................... 76/42

Primary Examiner—Roscoe V. Parker
Attorney, Agent, or Firm—Kolisch, Hartwell & Dickinson

[57] ABSTRACT

A grinding machine for grinding the cutters in left- and right-hand cutter links in saw chain. A pair of grinding wheel assemblies disposed on opposite sides of a saw chain support are actuated in turns to bring the wheels in the assemblies into a cutter link positioned on the saw chain support. Indexing structure positions the saw chain with a cutter link occupying a grinding station while supported on the chain support.

9 Claims, 7 Drawing Figures

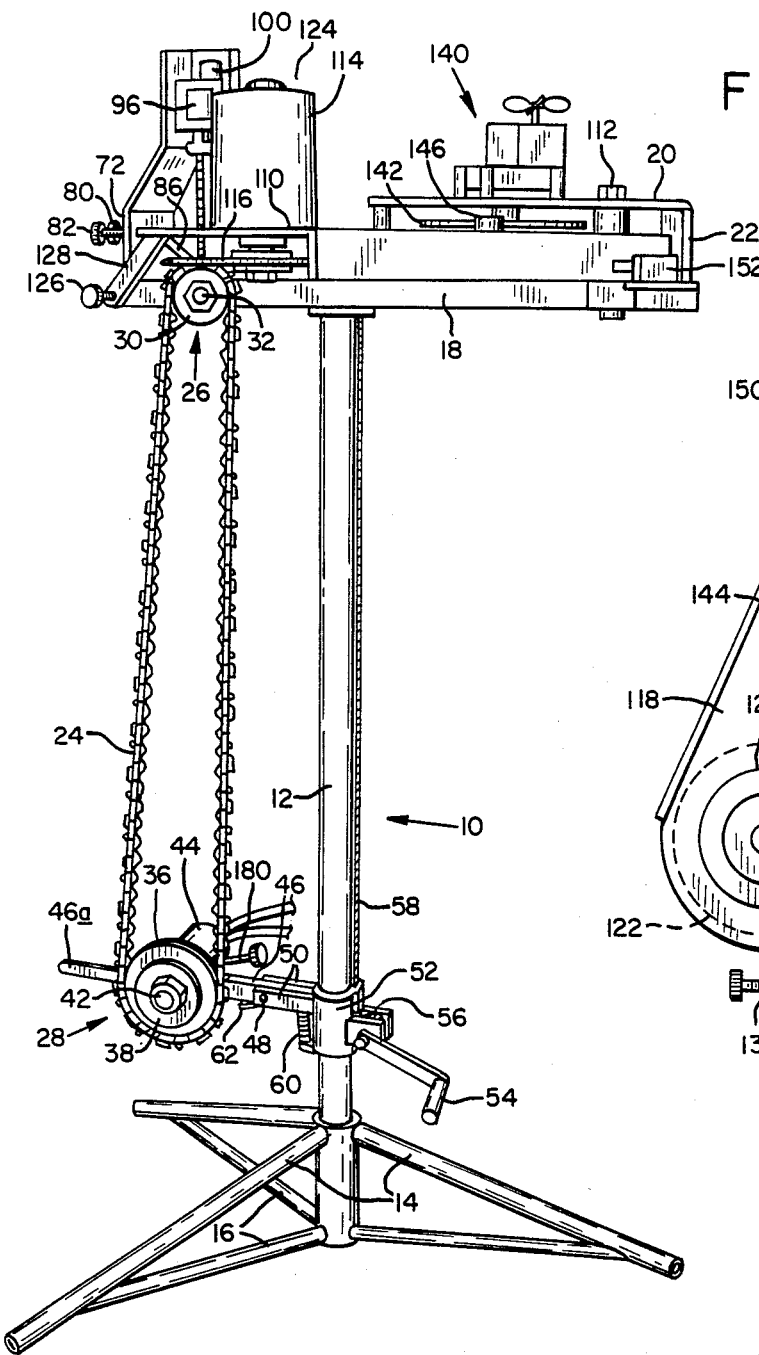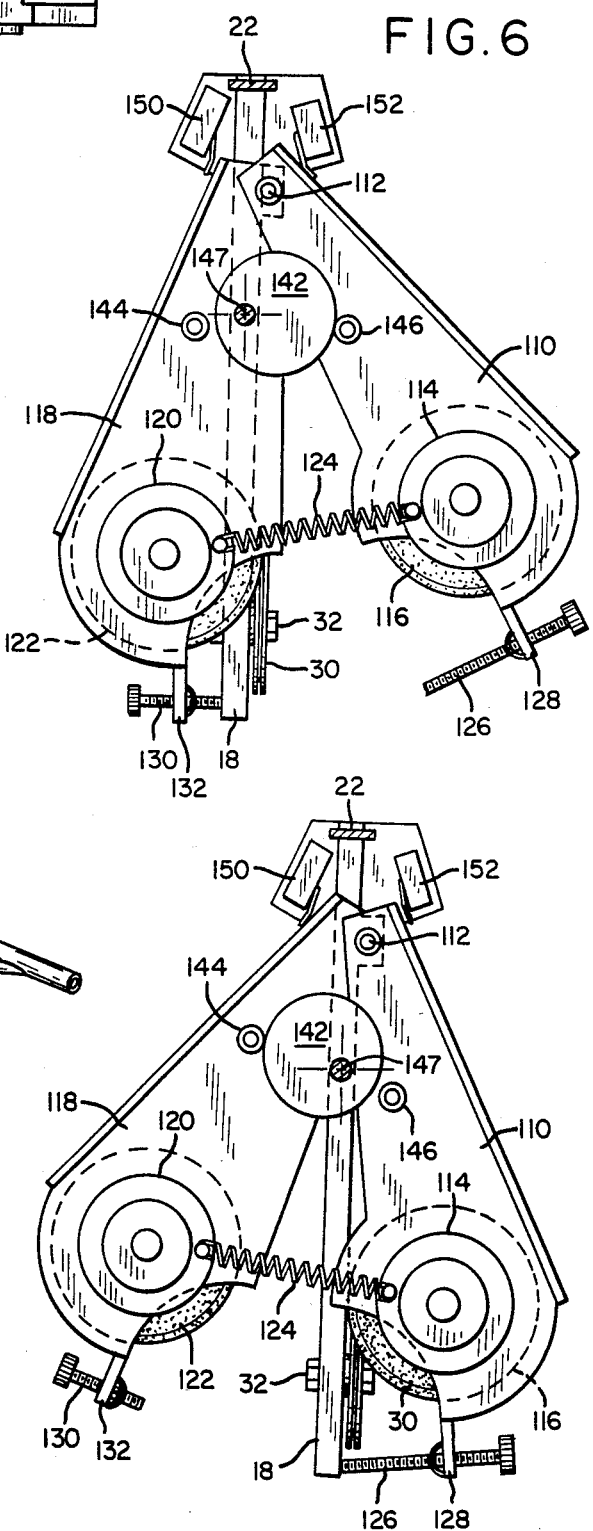

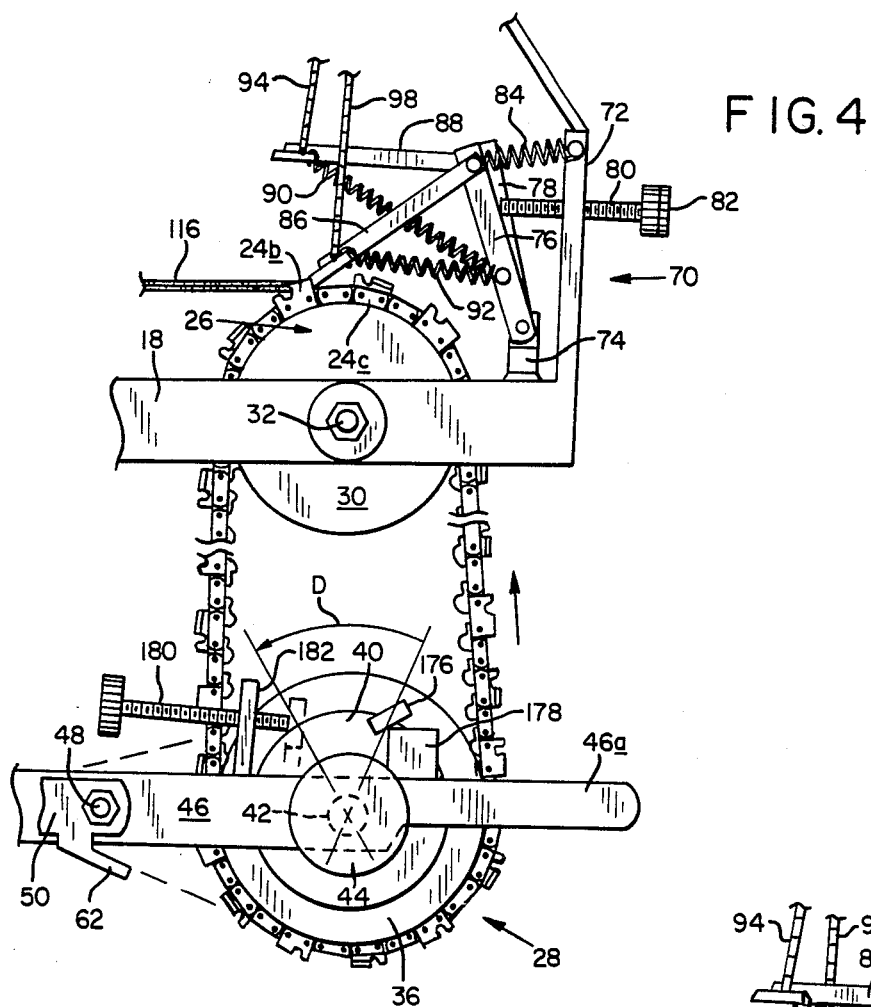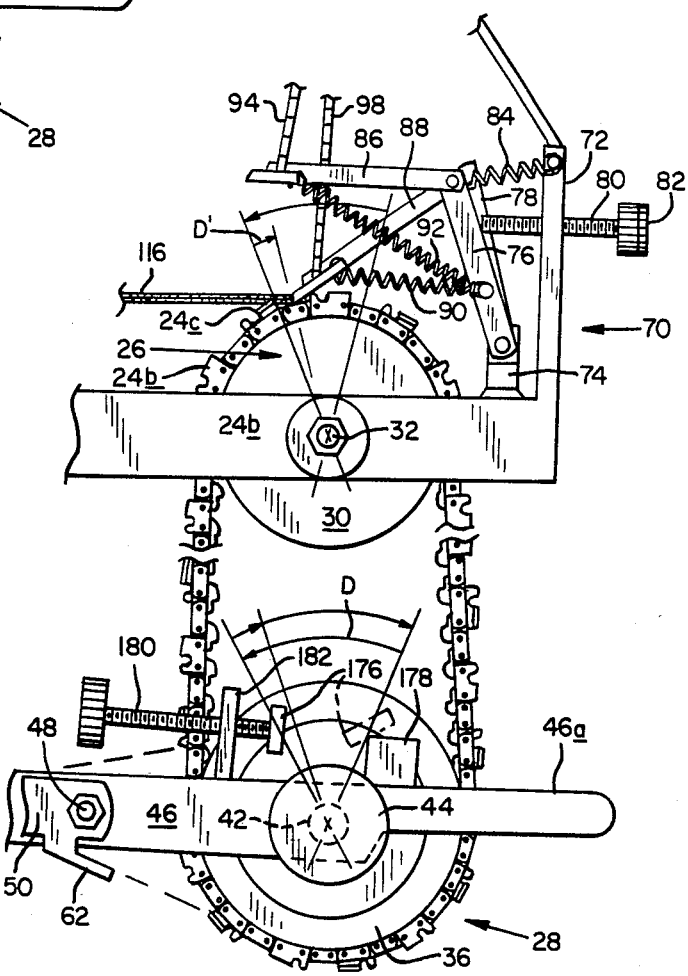

GRINDING MACHINE FOR CUTTERS IN SAW CHAIN

BACKGROUND AND SUMMARY OF THE INVENTION

This invention relates to grinding machines, and more particularly to an improved, unique type of grinding machine for grinding the cutters in saw chain cutter links.

Conventional saw chain, as such has developed in the United States and throughout the world, includes a series of cutter links provided at spacings along the length of the saw chain and interconnected to each other by other links such as tie strap links and center links. A cutter link typically includes a depth gauge at the forward end of the link integral with and projecting upwardly from the body portion of the link, and a cutter also joined to the body portion of the link and projecting upwardly from this body portion at the rear of the cutter link. The depth gauge and cutter are separated by a gullet. The cutter links include so-called left-hand cutter links, where the cutter link is a side link located on the left side of the chain (viewing the chain in the direction in which it travels during cutting), and right-hand cutting links where the cutter link is a side link appearing on the right side of the chain. It is usual in a cutting chain to intersperse left-hand cutter links with right-hand cutter links, so that successive links in a chain are of opposite hand.

A grinding wheel properly positioned to grind the cutting edge of a cutter in a left-hand cutter link has a general plane which is inclined relative to the cutter link, and this incline is opposite to the incline of the plane of a grinding wheel properly positioned to grind the cutting edge in the cutter of a right-hand cutter link. As a consequence, it is common in cutter grinding machines to set the grinding machine up so that the support for the saw chain and the grinding wheel are properly relatively positioned for the grinding of cutter links of one hand. The machine is then operated to grind all the cutter links of this hand in the saw chain. The machine is then set up for grinding cutter links of opposite hand, and the chain then rerun through the machine to grind links of opposite hand. This requires that the chain, in effect, be run in two complete passes through the grinding station of the machine. A machine of this description is illustrated in my earlier U.S. Pat. No. 4,044,635.

A machine of the above description does not lend itself to a completely automatic type of operation. Further, care must be taken that cutters in links of one hand sharpened during one pass of the chain through the machine are not inadvertently dulled with passage of the chain in another pass through the machine for the purpose of grinding cutters in links of opposite hand. Furthermore, the necessity for making adjustments in the machine before all the cutters are capable of being sharpened tends to increase the time that it takes to sharpen all the cutter links in the chain.

A general object of this invention, therefore, is to provide an improved grinding machine for grinding the cutters of cutter links in saw chain which is capable of grinding all the cutters without making an intermediate adjustment in the machine.

Another general object is to provide a grinding machine which may function to grind cutter links of alternating hand as they successively appear in a saw chain, with one pass of the saw chain through the machine.

Another object is to provide a cutter grinder of the above general description which includes a pair of power-rotated grinding wheels as part of a pair of grinding wheel assemblies. Provision is made whereby one grinding wheel may be shifted bodily to move its edge into a cutter link occupying a grinding station in the machine, this wheel being properly positioned to produce grinding of cutters in links of one hand. The grinding wheel of the other assembly is positionable to move its edge into a cutter link occupying the grinding station, with this wheel being properly positioned to produce grinding of cutters in links of opposite hand.

Yet another object of the invention is to provide a grinding machine with a pair of power-rotated grinding wheels as above described, which further includes means operatively interconnecting the grinding wheel assemblies coordinating their movements automatically, whereby when grinding the cutters of a saw chain, and with automatic positioning of successive cutter links in a cutting station, first one and then the other grinding wheel will be shifted to produce proper grinding of the cutter in the particular cutter link occupying the grinding station.

Another object of the invention is to provide a grinding machine which is substantially fully automatic in operation, and which is operable to grind the cutters of all the cutter links in a saw chain with one pass of the saw chain through the machine.

These and other objects and advantages are attained by the invention, which is described hereinbelow in conjunction with the accompanying drawings, wherein:

FIG. 1 is a perspective, essentially side elevation view, of a grinding machine constructed according to the invention;

FIG. 4 is a side elevation view illustrating chain support means and chain training mechanism incorporated in the grinding machine, viewing such from the opposite side of the machine as such is illustrated in FIG. 1;

FIG. 5 is a view essentially like the view of FIG. 4, but showing operating parts in a different position; and FIGS. 6 and 7 are somewhat simplified drawings viewing downwardly from the top of the machine and showing how support arms in the machine shift in position during the machine's operation.

Figure 2:
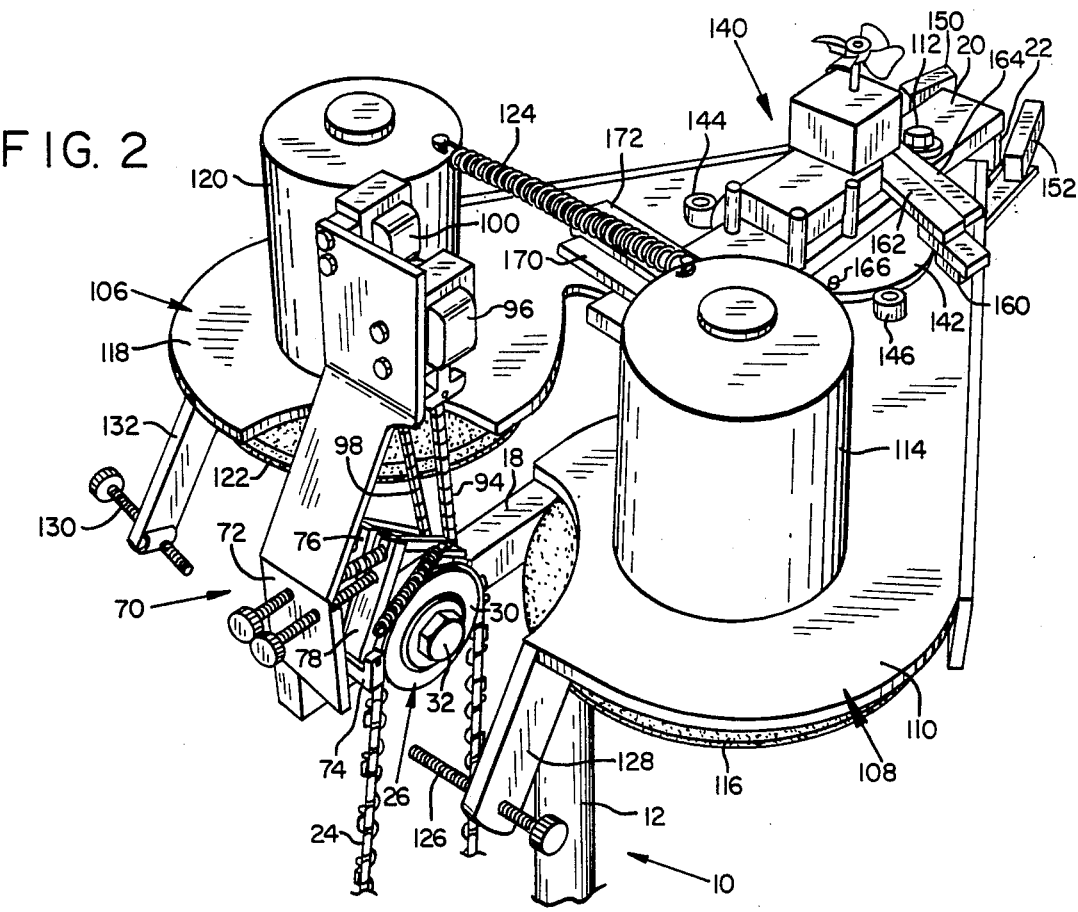
FIG. 2 is a perspective view, on a slightly larger scale, looking downwardly at the top of the grinding machine of FIG. 1.

Referring now to the drawings, and first of all more particularly to FIG. 1, the grinding machine illustrated comprises a frame indicated generally at 10 which includes an upright post 12 supported in an upright position on the ground by outwardly projecting legs 14 suitably secured to the base of the post and made rigid by struts 16. Secured to the top of the post is an elongate substantially horizontal bar 18. An elongate frame plate 20 is suitably secured to bar 18, as by bracket lugs exemplified by bracket lug 22.

During the grinding of a saw chain using the grinding machine illustrated, the saw chain, exemplified by saw chain 24, is supported in an upper expanse of the saw chain by saw chain support means indicated generally at 26. A lower expanse of the saw chain is trained over what is referred to herein as a saw-chain-training mechanism 28.

Figure 3:
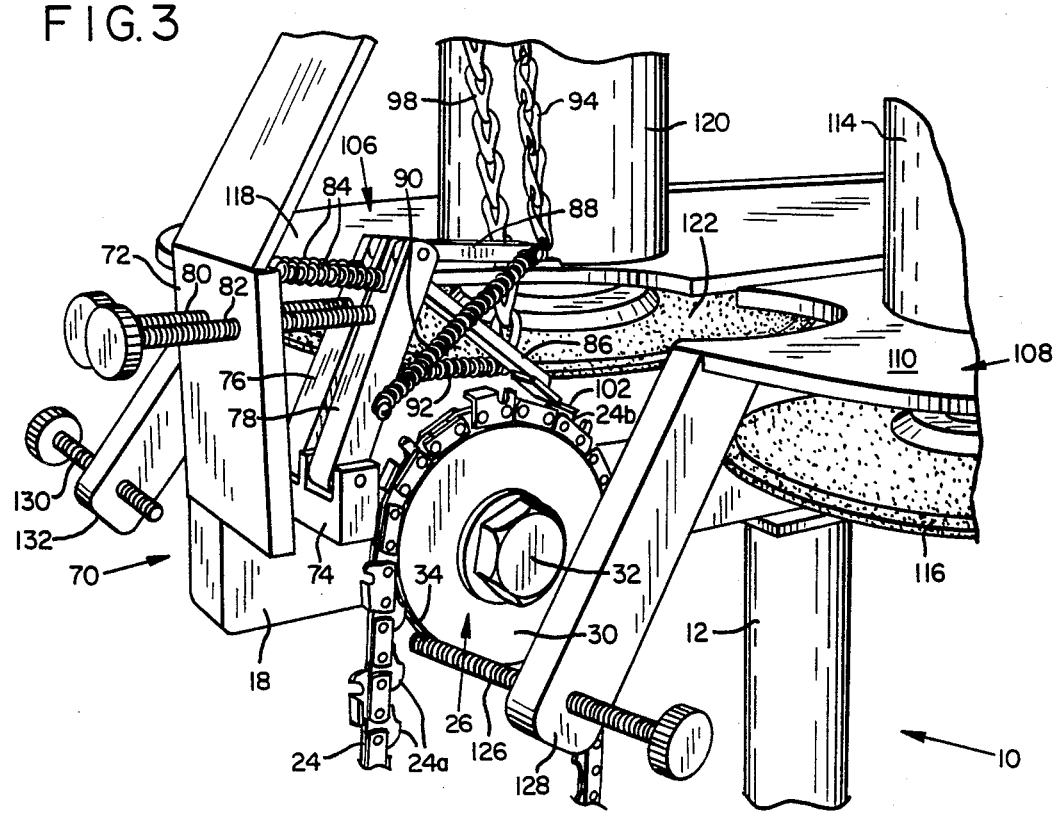
FIG. 3 is a perspective view, on a somewhat even larger scale, and with portions broken away, illustrating in greater detail indexing means provided in the machine and support means for supporting a reach of saw chain as such is ground.

Considering initially saw chain support means 26, and referring to FIGS. 2 and 3, such comprises a wheel 30. The wheel is rotatably supported by suitable means including bolt 32 on one side of bar 18. Conventional saw chain is provided with center drive links, illustrated by drive links 24a in FIG. 3, having driving portions that project away from the underside of the saw chain. Wheel 30 is grooved as at 34, and this groove receives these projecting portions of the drive links where the chain extends about the periphery of wheel 30.

Considering now saw-chain-training mechanism 28 (refer to FIG. 1), such also includes a grooved wheel, shown at 36 and such wheel trains a lower expanse of the saw chain where such extends about the periphery of the wheel.

Wheel 36 is sandwiched between a circular plate 38 on one side of the wheel, and a similar circular plate 40 located on the other side of the wheel (see FIG. 4). These two plates are fixed to the output shaft 42 (see FIG. 1) of a reversible hydraulic motor 44. The housing of the motor is appropriately secured to an elongate bar 46 having a protruding hand grip portion 46a.

Bar 46 at its inner end is pivotally mounted by pivot means 48 on bracket structure 50 secured to a collar 52 encompassing post 12. This collar is adjustably positionable along the length of post 12 by turning a crank handle which rotates a pinion gear 56 meshing with gear rack 58 extending along the post. Biasing the inner end of bar 46 upwardly is a compression spring 60 interposed between this inner end and a part of collar 52. This biasing tends to produce counterclockwise movement of bar 46 as illustrated in FIG. 1, downward movement of outer portions of the bar being limited by ear 62 which is part of bracket structure 50.

To place a saw chain on the grinding machine, upper portions of the chain are trained about wheel 30. Wheel 36 is elevated by pulling upwardly on hand grip portion 46a. This enables lower portions of the chain to be trained about wheel 36. With release of the hand grip portion the chain is tensed under the action of spring 60. The adjustment provided by the crank handle, pinion gear, and gear rack enable the machine appropriately to handle different lengths of saw chain.

Wheel 36 is frictionally disposed between the plates 38, 40, with a clutching arrangement thus established. With movement of the saw chain not retarded, operation of motor 44 rotates plates 38 and 40, and together with these plates wheel 36, to cause the saw chain to travel in the course established by wheels 26, 36. With chain movement stopped, plates 38, 40 rotate with the motor output shaft while sliding over opposite faces of wheel 36.

With reference to FIG. 3, successive cutter links in a saw chain are appropriately positioned for grinding while resting on wheel 30 in what is referred to as a grinding station, by an indexing means generally shown at 70. More specifically, secured to an end of bar 18 and projecting upwardly therefrom is bracket plate structure 72. Also secured to bar 18 adjacent bracket plate structure 72 is an arm mounting element 74. A pair of stub arms 76, 78 have bottom ends pivotally mounted on arm mounting element 74. The incline of these stub arms is adjustable, through turning of screws 80, 82 extending through accommodating threaded bores provided in bracket plate structure 72, inner ends of these screws abutting the stub arms. Springs 84 extending between the bracket plate structure and stub arms serve to pull upper extremities of the stub arms against inner ends of screws 80, 82. Pivotally mounted on the upper ends of the stub arms are elongate locator arms, or locators, indicated for stub arm 76 at 86, and for arm 78 at 88. A coil spring 90 tends to urge locator arm 88 in a clockwise position in FIG. 3, and a similar coil spring 92 performs a similar function for locator arm 86.

Chain 94 connected to the free end of locator arm 88 extends upwardly to an electrically operated solenoid 96 (see FIG. 2), and a similar chain 98 connected to the free end of locator arm 86 extends upwardly to a connection with electrically operated solenoid 100. These solenoids are suitably mounted on portions of bracket plate structure 72. With actuation of solenoid 96, chain 94 is drawn upwardly to swing locator arm 88 to a raised position. Deactuation of the solenoid permits spring 90 to pull the locator arm to a lowered position. Actuation of solenoid 100 functions to pull chain upwardly with upward movement of locator arm 86 occurring.

In the grinding of the cutters of cutter links in the saw chain, the locator arms are utilized to position the cutter links in the grinding station. This is illustrated in FIG. 3 by locator arm 86 which has its bottom extremity engaging the heel of cutter 102 in left-hand cutter link 24b illustrated in the drawing.

As best illustrated in FIG. 2, the grinding machine includes a pair of opposed grinding wheel assemblies, shown generally at 106 and 108. Considering grinding assembly 108, such comprises a support arm 110 pivotally mounted on the frame by pivot means 112 for pivotal movement in a horizontal plane. Supported on the top of the support arm is an electric motor 114. The output shaft of this motor extends downwardly from the motor through the arm to a connection with a grinding wheel 116. With energizing of the motor, the grinding wheel is rotated.

Grinding wheel assembly 106 is similar. Such includes a support arm 118 opposed to support arm 110 which adjacent its pivoted end is slightly overlapped with support arm 110. It also is mounted for pivotal movement by pivot means 112. An electric motor 120 mounted on the arm has an output shaft extending downwardly to a connection with a grinding wheel 122.

Extending between the motors of the two grinding wheel assemblies is a coil spring 124 serving to exert a bias urging them together. Limiting movement of assembly 106 toward assembly 108 is an adjustable screw 126 extending through an accommodating threaded bore provided in an ear 128 which is part of support arm 110. Limiting inward movement of grinding wheel assembly 106 is a screw 130 extending through and accommodating threaded bore provided in ear 132 which is part of support arm 118.

Powered means is provided for moving arms 110, 118 in a coordinated manner, for instance, in such a manner that when one grinding wheel moves into a cutter the other grinding wheel moves in the opposite direction.

More specifically, and referring to FIG. 2, shown at 140 is an electric motor mounted on the frame of the grinding machine which has its output shaft connected to an eccentrically mounted disc 142. Actuation of the motor produces rotation of this disc. Mounted on support arm 118 is a follower 144, and mounted on support arm 110 is a follower 146.

Movement of the support arms by disc 142 is perhaps best illustrated in FIGS. 6 and 7. With the parts in the condition shown in FIG. 6, arm 110 is shown swung outwardly essentially the maximum distance possible by eccentric disc 142. Arm 118 is pulled by spring 124 inwardly so that its grinding wheel is directly adjacent pulley wheel 30. Inward movement is limited by the end of screw 130 carried by this arm striking bar 18 of the frame.

With movement of disc 142 in a counterclockwise direction from the position shown in FIG. 6 about axis 147 (which is the axis about which this disc rotates as rotated by motor 140), the outer surface of the disc engages follower 144 and with continued movement tends to urge the follower to the left with outward movement of support arm 118. Support arm 110 is permitted to move inwardly under the urging of spring 124. Ultimately, the position of the parts reached is that shown in FIG. 7, where support arm 118 is moved fully outwardly by disc 142 with arm 110 pulled inwardly by spring 124 to the limited position defined by screw 126 striking bar 118.

As can be seen in FIGS. 6 and 7, microswitches 150, 152 are provided which are actuated by back and forth movement of the support arms 110, 118. These switches control actuation of solenoids 96, 100 producing raising and lowering of chains 94, 98 and the locator arms connected to these chains, in proper timed sequence, as will later be described.

Referring to FIG. 2, a microswitch 160 is carried by bracket 150, and another microswitch (obscured in the drawings) is carried by bracket 164. Both these brackets are part of the frame. Actuating these microswitches in proper timed sequence is an actuator 166 projecting upwardly from disc 142. Bars 170, 172 on the other side of the machine mount similar microswitches which are also actuated by actuator 166. These four microswitches control actuation of motor 44 producing advancing of the saw chain whereby successive cutter links are positioned in the cutting station.

Further considering this aspect of the machine, and considering FIGS. 4 and 5, secured to plate 40 (which is one of the plates sandwiching wheel 36) is a lug 176. Abutment block 178 mounted on bar 46 serves to limit clockwise rotation of wheel 36 beyond the position shown in FIG. 4 when lug 176 moves into contact with the block. Screw 180 supported in ear 182 limits counterclockwise rotation of wheel 36 beyond the position shown in FIG. 5, with lug 176 coming into contact with the end of the screw. This angular distance, indicated by the arrow "D" in FIG. 4, is adjustable with turning of screw 180.

Explaining how a chain is advanced, let it be assumed that left-hand cutter link 24b in FIG. 4 is properly positioned in the cutting station by locator arm 86 abutting the heel of the cutter in this link, as shown in FIG. 4. This properly positions the cutter of the link for grinding by wheel 116. After grinding, wheel 116 moves away from the cutter link through rotation of eccentric wheel 142 as earlier described.

To place a new link in the cutting station, for instance right-hand cutter link 24c, motor 44 is actuated to cause the sandwiching plates 40, 38 to rotate in a counterclockwise direction in FIG. 4. The plates rotate in this counterclockwise direction until lug 176 strikes screw 180 (which is the position shown in solid line for lug 176 in FIG. 5). Wheel 36 moves with the plates 38, 40, whereby the saw chain carried by wheel 30 is advanced approximately two and one-half links. This places link 24b (which has just been ground) in the position shown in FIG. 5, with the following right-hand cutter link 24c now becoming positioned slightly ahead of the grinding station. With raising of locator 86 and lowering of locator 88 the locators, wheel, and chain have the position shown in FIG. 5.

Operation of the hydraulic motor is now reversed causing sandwiching plates 38, 40 to rotate in a clockwise direction. Clockwise movement of wheel 36 results, but only for a short distance (the distance shown by the arrow "D'" in FIG. 5). On the heel of the new cutter reaching the cutting station and coming up against locator 88, chain movement is stopped. Sandwiching plates 38, 40 continue to rotate in a clockwise direction, but with sliding of the plates over wheel 36, until lug 176 strikes block 178. The parts have now returned to the position shown in FIG. 4, and the succeeding cutter link is now in the cutting station.

The microswitches, such as microswitch 160 carried by brackets 162, 164, control circuitry producing first counterclockwise and then clockwise rotation of circular sandwiching plates 38, 40 as discussed in connection with FIGS. 4 and 5 shortly after the grinding of a cutter has been produced by one of the grinding wheel assemblies. The microswitches carried by brackets 170, 172 produce a similar actuation of the motor shortly after grinding of a cutter in a cutter link produced by the other of the grinding wheel assemblies.

Referring to FIG. 3, locator 86, which is further from the viewer than locator 88, is shown positioning the heel of cutter 102 in left-hand cutter link 24b. Grinding of this cutter will occur under the grinding action of grinding wheel 116 located on the opposite end of the chain, or toward the viewer in this figure. With grinding of a right-hand cutter, locater 86 is raised and locator 88 is employed to position the heel of the cutter in the cutter link. Grinding of the cutter in a right-hand cutter link is performed by wheel 122. Indexing is thus done by the locator arm which is the further of the two from the grinding wheel which is to produce the grinding. The locator arm which is the closer of the two to the grinding wheel doing the grinding is moved out of the way to provide an unobstructed path of the grinding wheel into the cutter of the cutter link. Microswitches 150, 152 shown in FIGS. 6 and 7 control actuation of solenoids 96, 100 to produce the desired raising of the respective locator arms at the times required to produce this operation.

It can be visualized with reference to FIG. 3 that the plane of grinding wheel 116 is inclined and has a proper orientation with respect to left-hand cutter link 24b whereby its cutter 102 thereof is properly ground on the wheel advancing into the cutter link. On a left-hand cutter link being moved into the grinding station and positioned by locator arm 88, grinding wheel 122 has a properly inclined relationship with respect to this cutter link of opposite hand.

Generally summarizing the construction of the grinding machine, and its operation, it features two oppositely disposed support arms and grinding wheel assemblies located generally on opposite sides of the cutting station defined adjacent the top of wheel 30 in chain support means 26. A saw chain is easily placed in the grinding machine by training such over wheel 30 and then through manipulation of bar 46 whereby bottom regions of the chain may be trained over wheel 36 of saw-chain-training mechanism 28. Once positioned, the chain is tensioned by spring 60.

Successive left- and right-hand cutter links in the chain are all ground with one pass of the chain through the apparatus. In the grinding of links of one hand, one grinding wheel assembly is employed, and in the grinding of links of opposite hand, the other grinding wheel assembly is employed. The operation of the grinding machine may be entirely automatic, with the machine automatically producing incremental shifting of the chain to position successive cutter links in the grinding station and to produce the grind required after such positioning has resulted.

While there has been described a specific embodiment of the invention, obviously changes in variations are possible. It is desired, therefore, to cover all such modifications and variations as would be apparent to one skilled in the art.

It is claimed and desired to secure by Letters Patent:

1. A grinding machine for grinding the cutters in saw chain cutter links comprising:
    saw chain support means for supporting the bottom portion of a reach of saw chain with the top portion of the chain projecting outwardly from the support means,
    indexing means for positioning a cutter link in a reach of saw chain occupying said support means with the cutter link in a grinding station,
    first and second power-driven grinding wheel assemblies located on opposite sides of a reach of chain supported by said support means,
    each grinding wheel assembly including a power-rotated grinding wheel and a mounting for the wheel accommodating bodily movement of the wheel from a retracted position, where the edge of the wheel is spaced from said grinding station, and a working position, where the edge of the wheel extends into the grinding station with grinding of the cutter of a cutter link located in said grinding station, the plane of the grinding wheel of one grinding wheel assembly having a relationship with respect to a cutter link in said station appropriate to grind the cutter of cutter links of one hand and the plane of the grinding wheel of the other grinding wheel assembly having a relationship with respect to a cutter link in the grinding station appropriate to grind the cutter of cutter links of opposite hand.

2. The grinding machine of claim 1, wherein said indexing means comprises a pair of adjustably positionable cutter link locators, one locator being employed to position cutter links of one hand in said cutting station and the other locator being employed to position cutter links of opposite hand in said grinding station, each locator having an operative cutter-link-positioning position, and an inoperative position, and powered means for each locator actuatable to shift the locator between operative and inoperative positions.

3. The grinding machine of claim 1, which further comprises a frame, and said mounting for each grinding wheel assembly comprises a support arm pivotally mounted on said frame with pivoting movement of the arm swinging the grinding wheel of the assembly between retracted and working positions.

4. The grinding machine of claim 3, wherein the support arms of the grinding wheel assemblies are pivotally moveable in essentially a common plane, and are interconnected so that movement of one arm to place the grinding wheel mounted on the arm in a working position is accompanied by movement of the other arm to place the grinding wheel mounted on this other arm to a retracted position.

5. The grinding machine of claim 1, which further comprises a chain-training mechanism engaging the chain remote from said saw chain support means, said chain-training mechanism including power-operated means for moving saw chain in increments to place successive cutter links in said cutting station, powered means for producing movement of the grinding wheel assemblies between retracted and working positions under power, and control means controlling actuation of said power-operated means in said chain-training mechanism and actuation of the powered-means producing movement of said grinding wheel assemblies.

6. The grinding machine of claim 5, wherein said chain-training means includes a wheel which is adapted to have saw chain trained thereabout, and said power-operated means comprises a reversible motor having an output shaft and clutch means connecting the output shaft of the motor and said wheel.

7. A grinding machine for grinding cutters in saw chain cutter links comprising:
    a frame,
    a pair of opposed support arms and pivot means pivotally mounting one set of ends of the arms on said frame, said arms having spaced-apart free ends opposite their said one set of ends,
    saw chain support means mounted on said frame and disposed intermediate the free ends of said arms, said saw chain support means operating to support a reach of saw chain with upper portions of the saw chain projecting upwardly from the support means,
    indexing means for positioning a cutter link in a reach of saw chain occupying said support means with the cutter link in a grinding station,
    a first power-driven grinding wheel mounted on the underside of the free end of one arm and a second power-driven grinding wheel mounted on the underside of the free end of the other arm, pivotal movement of one arm operating to shift the grinding wheel mounted thereon whereby the edge of the wheel moves into a cutter link occupying said grinding station and the plane of the wheel suiting the wheel for grinding the cutter of a cutter link of one hand, pivotal movement of the other arm operating to shift the grinding wheel mounted thereon whereby the edge of the wheel moves into a cutter link occupying said grinding station and the plane of the wheel of this other arm suiting the wheel for grinding the cutter of a cutter link of opposite hand, and
    means operatively connecting the support arms whereby pivotal movement of one arm with shifting of the grinding wheel mounted thereon into a cutter link occupying said grinding station is accompanied with pivotal movement of the other arm with shifting of the grinding wheel mounted thereon away from the cutter link, said interconnecting means including powered means for producing coordinated movement of the arms under power.

8. The grinding machine of claim 7, wherein the support arms move in substantially horizontal planes, and wherein said interconnecting means comprises powered cam means engaging said arms operable to produce coordinated movement of the arms.

9. The grinding machine of claim 7, wherein said indexing means comprises a pair of adjustably positioned cutter link locators, one locator being employed to position cutter links of one hand in said cutting station and the other locator being employed to position cutter links of opposite hand in said cutting station, each locator having an operative cutter-link-positioning position and an inoperative position, and powered-means for each locator operable to shift the locator between operative and inoperative positions.

* * * * *